Patented Jan. 26, 1943

2,309,377

UNITED STATES PATENT OFFICE 2,309,377

NONLEAFING ALUMINUM PASTE AND METHOD OF MAKING SAME

Gordon M. Babcock, Louisville, Ky., assignor to Reynolds Metals Company, New York, N. Y., a corporation of Delaware No Drawing. Application October 9, 1940, Serial No. 360,501

12 Claims. (Cl. 106—243)

This invention relates to metallic pigments for use in the preparation of polychromatic coatings or finishes and non-leafing aluminum metallic finishes, and more particularly to non-leafing aluminum pastes and their methods of manufacture.

It has been known for some time that a non-leafing finish can be prepared by carefully grinding an ordinary leafing pigment, in the form of a powder or a paste, either in a liquid carrier or solvent which is compatible with the coating base with which the pigment is adapted to be used, or in the base itself. Such a grinding operation so alters the surface of the pigment by mechanical action as to make it non-leafing. The grinding, however, not only increases the length of time required for, and the cost of, preparation of the pigment or paint, but also constitutes a fire hazard when the pigment is ground in powder form.

It is therefore the object of the present invention to provide a new and improved method of producing a non-leafing aluminum paste which avoids the necessity for grinding, and wherein the deleafing action is brought about by chemical, rather than mechanical, means.

Inasmuch as the paste produced by the method herein disclosed is itself of novel composition, the invention also encompasses the product as well as the process by which it is made.

The basis of the present invention resides in the discovery that certain highly polar materials, especially when in solution, have the property of chemically destroying the leafing characteristics of otherwise full leafing aluminum powder when combined with such powder in the form of a paste. It is believed that the deleafing action of the polar active material is due to a rearrangement of the oriented molecules of stearic acid already present on the flakes of the powder, so that, by virtue of what is thought to be a preferential "wetting" action, the surfaces of the powder particles are readily "wetted" by the vehicle with which the paste so made is mixed. It has been found that a paste of this character disperses more readily than others when mixed with the base of a polychromatic paint, enamel or lacquer finish, and also gives greater covering since the "wetting" process tends to minimize agglomeration.

In general, the preferred method of the present invention consists in simply adding to a regular, full leafing aluminum powder a suitable thinner or carrier in which has been incorporated a deleafing agent consisting of one or more materials of the group comprising (a) the salts or soaps of lead, zinc and calcium, and (b) the highly polar active alcohols, esters, ketones, aldehydes and the like. In commercial production, it is preferred to use a lead, zinc or calcium salt or soap as the deleafing agent because of the rapidity of the deleafing action of these compounds, and the fact that supplies thereof of uniformly high quality can be readily obtained on the open market at relatively low cost. Of the metal soaps, the naphthenates, resinates, linoleates and tungates are most suitable for the purposes of the invention, although lead compounds such as tetra-ethyl lead, lead laurate, lead palmitate and other lead salts or soaps which are soluble in the paste carrier are also useful.

The thinner or carrier of the paste may be selected as desired from among the many available, having due regard to its compatibility with the coating base to which the paste will ultimately be added, although it is generally preferred to use either xylol or toluol because of the wide range of paints, lacquers, enamels and the like with which they are compatible. The group of suitable carriers also includes the straight chain hydrocarbon thinners marketed as mineral spirits, kerosene, gasoline, petroleum naphtha, and the like, as well as aromatic thinners such as benzol and coal tar naphthas, and hydrogenated petroleum naphthas containing high percentages of aromatics.

The following is one example of a working formula which has proven to be quite successful in practice in producing a non-leafing aluminum paste according to the present invention:

| | Pounds |
|---|---|
| Aluminum powder (fully polished and leafing) | 65 |
| Lead naphthenate solution (24% lead) | 1 |
| Xylol | 33.5 |
| Alcohol | 0.5 |
| | 100.0 |

The use of the small amount of alcohol in addition to the lead naphthenate solution increases the speed of the deleafing reaction, which result could also be accomplished by increasing the relative quantity of lead naphthenate. The speed of reaction may also be decreased by diminishing the relative proportions of the deleafing agents. If desired, a zinc or calcium salt or soap may be substituted for the corresponding lead compound in the foregoing formula, and in the same relative proportion, although the reaction with zinc or calcium soaps is, as a rule, somewhat slower than when a lead soap is used.

A liquid carrier embodying a relatively high percentage of alcohol, ethyl acetate, acetone, or the like, would also provide the desired deleafing action, the highly polar liquid being either used alone, or dissolved in a thinner compatible with the coating in which the paste is to be dispersed.

A typical formula for a paste wherein the deleafing action is produced by the use of a highly polar active organic material alone is as follows:

| | Pounds |
|---|---|
| Aluminum powder (fully polished and leafing) | 60 |
| Ethyl acetate | 20 |
| Toluol | 20 |
| | 100 |

This formula may be varied by substituting for the ethyl acetate such other highly polar materials as methyl, ethyl or butyl alcohol, butyl acetate, ethyl lactate, acetone, etc., the speed of the reaction being largely dependent upon the amount of the acetate or other deleafing agent relative to that of the toluol or whatever other thinner may be used compatibly with the color base.

In practicing the method of the present invention, the usual procedure is to first dissolve or suspend the deleafing agent or agents in the thinner or carrier, and then add to the liquid mixture thus formed the leafing powder to form a paste. In some instances, however, it may be preferred to simply add the deleafing agent to a previously formed paste composed of leafing powder and carrier. Under normal conditions of temperature, pressure, humidity and the like, the leafing characteristics of a paste conforming to the first formula above recited will be almost completely, if not entirely, destroyed in less than 48 hours after the paste has been formed. This time may be decreased by varying the proportions and/or materials of the deleafing agents, as above indicated, or by increasing the temperature at which the mixture of carrier and deleafing agent or agents is permitted to act upon the leafing aluminum pigment. Agitation of the materials when forming the paste, or agitation of the paste itself, will also decrease the time required for the deleafing reaction.

There is thus provided by the present invention a novel, simple and economical method of producing a non-leafing aluminum paste which is susceptible of direct dispersion in a wide variety of coating bases for the production of polychromatic finishes. The paste, which is also novel in composition, may be directly dispersed in a color base to produce a non-leafing polychromatic coating without the necessity for grinding or otherwise treating the material to render it non-leafing. Not only does a paste prepared in accordance with the present invention disperse more rapidly in the coating base and provide greater covering than ordinary leafing materials, but it has also been found that, because of the fact that the pigment is all within the film, rather than partially on top thereof, it can be applied without giving rise to the well-known, objectionable smudging effect which results when some object is accidentally drawn across the air dried surface of the paint.

Although the method of preparing, and the composition of, the non-leafing paste of the present invention have been described herein in some detail, and two specific formulae have been set forth as exemplary of its practical application, it is to be expressly understood that the invention is not limited to the particular examples given, but that the ingredients of the paste, their relative proportions and the particular mode of preparation of the paste may be varied within limits which will be clearly apparent to those skilled in the art without departing from the underlying concept of the invention. Reference is therefore to be had to the appended claims for a definition of the scope of the invention.

What is claimed is:

1. A method of making a non-leafing aluminum paste from a normally-leafing aluminum powder while retaining the shape and size of the aluminum particles which consists in combining without grinding a suitable thinner, a deleafing agent composed of at least one material selected from the group consisting of the soaps of lead, zinc and calcium, and a normally leafing aluminum powder in such proportions as to form a paste, the leafing characteristics of said powder being substantially destroyed by the chemical action of the deleafing agent.

2. A method of making a non-leafing aluminum paste from a normally-leafing aluminum powder while retaining the shape and size of the aluminum particles which consists in combining without grinding a suitable thinner, a deleafing agent composed of an alcohol and at least one material selected from the group consisting of the soaps of lead, zinc and calcium, and a normally leafing aluminum powder in such proportions as to form a paste, the leafing characteristics of said powder being substantially destroyed by the chemical action of the deleafing agent.

3. A method of making a non-leafing aluminum paste from a normally-leafing aluminum powder while retaining the shape and size of the aluminum particles comprising the steps of dissolving or suspending in a suitable thinner a deleafing agent composed of at least one of the groups consisting of the soaps of lead, zinc and calcium, and then combining without grinding the liquid mixture thus formed with a normally leafing aluminum powder to form a paste, the leafing characteristics of said powder being substantially destroyed by the chemical action of the deleafing agent.

4. A method of making a non-leafing aluminum paste from a normally-leaping aluminum powder while retaining the shape and size of the aluminum particles comprising the steps of dissolving or suspending in a suitable thinner a deleafing agent consisting of lead naphthenate and alcohol, and then combining without grinding the liquid mixture thus formed with a normally leafing aluminum powder to form a paste, the leafing characteristics of said powder being substantially destroyed by the chemical action of the deleafing agent.

5. A method of making a non-leafing aluminum paste from a normally-leaping aluminum powder while retaining the shape and size of the aluminum particles comprising the steps of dissolving or suspending in a suitable thinner a deleafing agent selected from the group consisting of the soaps of lead, zinc and calcium and then combining without grinding the liquid mixture thus formed with a normally leafing aluminum powder to form a paste, the leafing characteristics of said powder being substantially destroyed by the chemical action of the deleafing agent.

6. In the preparation of a non-leafing aluminum paste from a fully leafing aluminum powder while retaining the shape and size of the aluminum particles, the step of chemically destroying the leafing characteristics of said powder which consists in combining the powder with at least one deleafing material selected from the group consisting of the soaps of lead, zinc and calcium.

7. In the preparation of a non-leafing aluminum paste from a fully leafing aluminum powder while retaining the shape and size of the aluminum particles, the step of chemically destroying the leafing characteristics of said powder which consists in combining the powder with alcohol and with at least one deleafing material selected from the group consisting of the soaps of lead, zinc and calcium.

8. In the preparation of a non-leafing aluminum paste from a fully leafing aluminum powder while retaining the shape and size of the aluminum particles, the step of chemically destroying the leafing characteristics of said powder which consists in combining the powder with a liquid carrier containing a deleafing agent composed of at least one of the groups consisting of the soaps of lead, zinc and calcium.

9. In the preparation of a non-leafing aluminum paste from a fully leafing aluminum powder while retaining the shape and size of the aluminum particles, the step of chemically destroying the leafing characteristics of said powder which consists in combining the powder with a liquid carrier containing a deleafing agent consisting of lead naphthenate and alcohol.

10. An aluminum paste adapted for use in the manufacture of non-leafing paints, enamels and lacquers, consisting of a normally leafing aluminum powder whose leafing film is mechanically left intact, a thinner, and at least one deleafing material selected from the group consisting of the soaps of lead, zinc and calcium, the aluminum powder constituting more than 50% of the total weight of the paste.

11. An aluminum paste adapted for use in the manufacture of non-leafing paints, enamels and lacquers, consisting of a normally leafing aluminum powder whose leafing film is mechanically left intact, a thinner, and a deleafing agent comprising material selected from the group consisting of the soaps of lead, zinc and calcium, and also comprising alcohol, the aluminum powder constituting more than 50% of the total weight of the paste.

12. An aluminum paste adapted for use in the manufacture of non-leafing paints, enamels and lacquers, consisting of the following materials in substantially the designated proportions by weight: a normally leafing aluminum powder whose leafing film is mechanically left intact 65%, a thinner 33.5%, and a deleafing agent 1.5%, said deleafing agent consisting of a lead naphthenate solution and alcohol.

GORDON M. BABCOCK.